United States Patent [19]
Read

[11] 3,799,444
[45] Mar. 26, 1974

[54] SWARF REMOVAL

[75] Inventor: Alois Walter Harry Read, London, England

[73] Assignee: Molins Machine Company Limited, London, England

[22] Filed: Aug. 10, 1970

[21] Appl. No.: 62,524

[30] Foreign Application Priority Data
Aug. 13, 1969 Great Britain.................... 40435/69

[52] U.S. Cl. .............................................. 239/186
[51] Int. Cl. ............................................ B05b 3/18
[58] Field of Search .......... 239/178, 180, 184, 186, 239/229 X, 266, 268

[56] References Cited
UNITED STATES PATENTS
| | | | |
|---|---|---|---|
| 182,413 | 9/1876 | Chase | 239/229 |
| 3,030,031 | 4/1962 | Barker | 239/229 |
| 2,910,993 | 11/1959 | Phillips | 239/186 X |
| 3,545,459 | 12/1970 | Phillips | 239/186 X |
| 3,237,389 | 3/1966 | Green | 239/229 X |
| 3,102,545 | 9/1963 | Knight et al. | 239/186 X |

FOREIGN PATENTS OR APPLICATIONS
9,661 4/1913 Great Britain..................... 239/186

Primary Examiner—Lloyd L. King
Attorney, Agent, or Firm—Emory L. Groff; Emory L. Groff, Jr.

[57] ABSTRACT

An arrangement for cleaning swarf from a workpiece after machining. A number of flexible rubber tubes supplied with compressed air from a manifold are passed over the workpiece. The tubes have open ends and the air issuing therefrom causes the tubes to perform random movements to direct cleaning air jets over the workpiece from all angles.

1 Claim, 4 Drawing Figures

PATENTED MAR 26 1974

3,799,444

Inventor
ALOIS W. H. READ
By Emory L. Groff Jr.
Attorney

PATENTED MAR 26 1974

Inventor
ALOIS W. H. READ
By Emery L. Groff Jr.
Attorney

SWARF REMOVAL

The present invention relates to the cleaning of articles and more particularly to the removal of swarf from a machined workpiece.

In our British Appln. 21106/67 and U.S. Ser. No. 721,034 dated 12 April 1968 apparatus is disclosed for loading and unloading pallets into and from a machine tool. The apparatus comprises essentially a cruciform member which is rotatable within the casing. Pallets carrying workpieces to be machined are loaded onto an arm of the cruciform which is then rotated into a second position at which the loaded pallets are ejected from the cruciform member into the machine tool. Subsequent to the machining operation the machined workpieces and pallets supporting them are ejected from the machine tool back onto an arm of the cruciform which then rotates to the first position at which the pallets, with the machined workpieces on them, are unloaded from the cruciform.

The present invention is particularly concerned with providing in such a loading apparatus, means for removing swarf from the pallets and machined workpieces as they pass out of the loading apparatus, although the present invention is not limited to its incorporation in such a loading and unloading apparatus.

According to the present invention apparatus for cleaning articles comprises at least one flexible tube, means to supply fluid under pressure to one end of the tube to be emitted from the other end of the tube, said other end being open and unrestrained, the material, length, wall thickness and diameter of the tube, and the pressure of the fluid, being chosen so that the open end of the tube executes random movements and thus directs a stream of fluid in a random path around the article.

The apparatus may comprise a housing to contain the article to be cleaned, and there may be a plurality of flexible tubes mounted on a carriage within the housing, and means to move the carriage transversely of its length past the article to be cleaned. The carriage may comprise a manifold on which the flexible tubes are mounted spaced apart and through which the fluid is supplied to the tubes, a slide member supporting each end of the manifold, and two parallel slideways substantially transverse to the manifold on which the slides can travel. The means to move the carriage may comprise an endless band secured to each slide member and passing around a plurality of pulleys and a reversible electric motor to drive the band.

One embodiment of the invention will now be described, by way of example, with reference to the accompanying drawings, in which.

The aforementioned applications show a pallet loading apparatus for loading and unloading pairs of pallets carrying workpieces into and out of a machine tool.

The pallet loader comprises essentially a cruciform member, generally indicated in the accompanying figures by 1 (FIGS. 2 and 4) having four radiating arms or paddles 2 and which is rotatable about a horizontal shaft 3.

Figure 2:
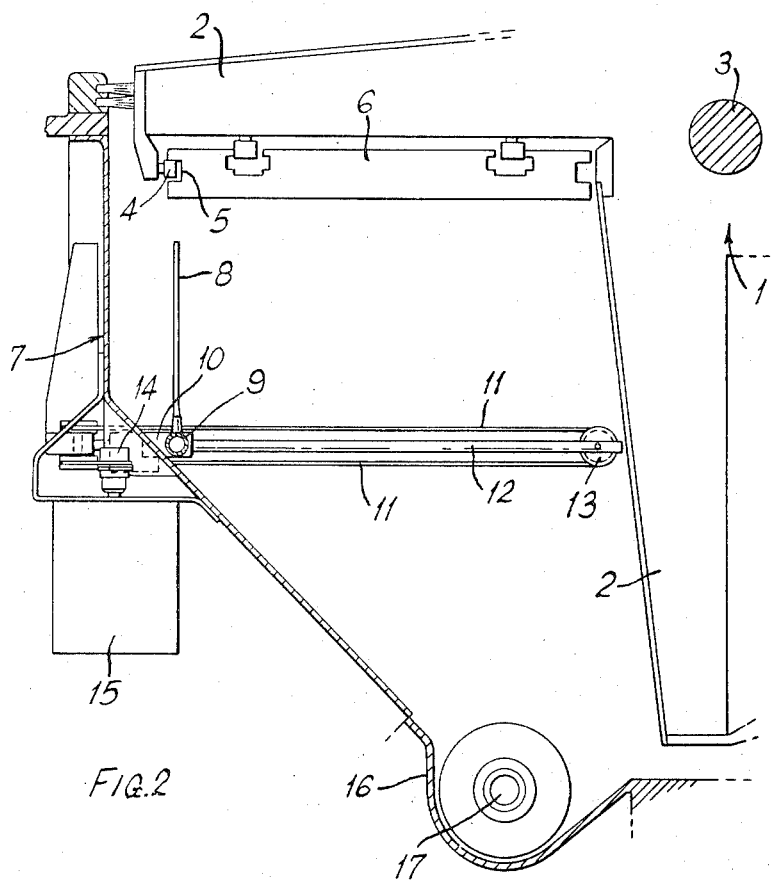
FIG. 2 is a side view, partly in section of the embodiment shown in FIG. 1.

Each arm 2 carries rollers 4 which engage in grooves 5 in a pallet 6 in order to locate and support the pallet on the arm 2. FIG. 2 shows a roller 4 at the radially-outer edge of an arm 2, similar rollers are also provided at the radially-inner edges of the arm 2, but these are not shown. For the sake of clarity the rollers have been omitted from FIG. 4.

Figure 4:
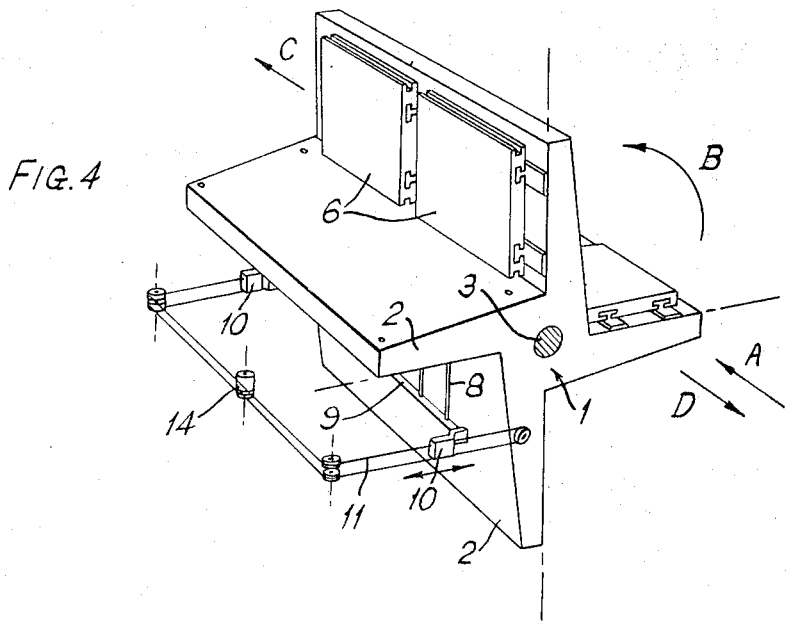
FIG. 4 is a perspective view of the arrangement shown in FIG. 2.

Each pallet 6 is loaded onto an arm 2, as indicated by the arrow A in FIG. 4, when the latter is in a first and horizontal loading position and the cruciform member 1 is then rotated in the direction of the arrow B (FIG. 4) to bring the said arm into a second and vertical position in which the pallet is then ejected into the machine tool in the direction of the arrow C (FIG. 4). The workpiece in the pallet is then machined in the machine tool. Subsequent to the machining operation the pallet is returned to the cruciform member onto an arm 2 in the said second position and the cruciform member 1 is then rotated in the direction of the arrow B into the first position, in which the pallet is unloaded in the direction of the arrow D (FIG. 4) from the arm 2.

Figure 1:
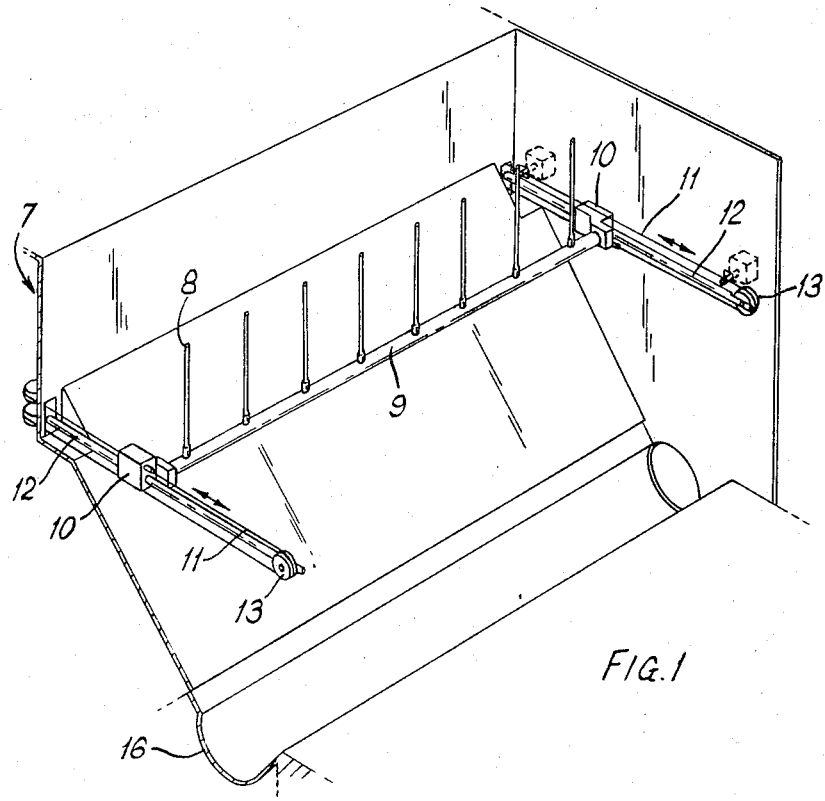
FIG. 1 is a fragmentary perspective view of apparatus according to the invention.

In moving from the second position to the first position the pallet passes through a cleaning chamber generally indicated by 7 (FIGS. 1 and 2).

The cleaning chamber incorporates a plurality of flexible and resilient rubber tubes 8 which are mounted on a manifold in the form of a hollow cross beam 9 through which each tube can be supplied with air under pressure. The cross beam 9 is supplied with air under pressure by means of a flexible pipe (not shown). The cross beam 9 has its ends mounted in slide members 10 each of which is slidable along a slideway in the form of a rod 12, the two rods 12 being parallel to one another.

Figure 3:
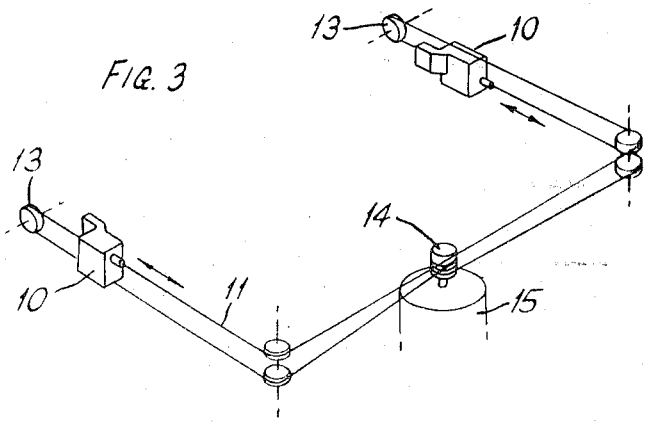
FIG. 3 is a perspective view showing the drive arrangement for the embodiment shown in FIG. 1.

Each slide 10 is connected to the same endless band 11, the configuration of which is shown clearly in FIG. 3. The endless band passes round pulleys 13 and around a rotatable bobbin 14 which is drivable by an electric motor 15. The configuration of the endless band 11 is such that rotation of the bobbin 14 by means of the electric motor 15 will cause the two slide members 10 to move in the same direction, and opposite rotation of the bobbin 14 will similarly cause the slide members 10 to move in the opposite direction, as indicated by the double headed arrows in FIG. 3.

This movement of the slide members 10 will result in movement of the cross beam 9, and thus of the flexible tubes 8 in a direction normal to the longitudinal axis of the cross beam 9.

Sensing devices such as limit switches (not shown) are located near the ends of the travel of at least one of the slide members 10 and are electrically connected to trigger off a two position bistable relay so that when actuated by the slide member 10 reaching the end of its travel they will cause the relay to reverse the direction of drive of the electric motor 15 and thus reverse the direction of travel of the two slide members 10 and consequently the flexible tubes 8.

The length of the tubes 8, their internal diameter and wall thickness and the material from which they are made and the air pressure are selected so that the pressurised air emanating from their open ends results in the tubes 8 executing random movement, and this random movement combined with the movement caused by the transverse beam 9, causes the air-jets emanating from the tubes to cover a relatively wide area compared with what would be the case if the tubes 8 were rigid. By this arrangement it has been found that the pallet 6 and machined or partially machined workpiece mounted on it, when in the position shown in FIG. 2 can be effectively cleaned of swarf before the arm 2 on which they are mounted rotates into the first position.

The swarf cleaned off the pallet and workpiece is collected in a trough 16 at the bottom of the cleaning chamber 7 and is removed from the trough 16 by a screw conveyor 17.

Clearly effective random movement could be obtained with various combinations of the factors mentioned. A suitable combination used in the described embodiment is:

Material of tubes — Neoprene of 60° Shore hardness

Length — 5½ inches
Wall thickness — 1.2 mm
Inside diameter — 2.3 mm
Air pressure — 80 pounds per square inch

What I claim as my invention and desire to secure by letters Patent is:

1. Apparatus for removing swarf from a machined workpiece comprising a chamber enclosing the workpiece from which swarf is to be removed, a manifold disposed within the chamber and connected to a supply of fluid under pressure, a slide member at each end of said chamber supporting said manifold, a plurality of spaced apart flexible tubes connected at their ends to the manifold, the other ends being open and unrestrained, said tubes connected to the manifold so as to be directed substantially vertically upwards in the unflexed condition of the tubes, whereby the weight of the open ends of the tubes assists recoiling of the tubes when fluid under pressure is supplied to the tubes, and means to reciprocate the manifold transversely of its length past the workpiece, said means comprising two parallel slideways substantially transverse to the manifold on which the slide members can travel, an endless band secured to each slide member and passing around a plurality of pulleys, a reversible electric motor driving the band, the tubes being constructed so that when fluid under pressure is supplied to the tubes, and the manifold is reciprocated the open ends recoil and execute random movements, thus directing streams of fluid in random paths around the workpiece and removing swarf therefrom.

* * * * *